United States Patent
Austen et al.

(10) Patent No.: US 6,842,870 B2
(45) Date of Patent: Jan. 11, 2005

(54) METHOD AND APPARATUS FOR FILTERING ERROR LOGS IN A LOGICALLY PARTITIONED DATA PROCESSING SYSTEM

(75) Inventors: Christopher Harry Austen, Austin, TX (US); Douglas Wayne Oliver, Round Rock, TX (US); Paul Henry Prahl, III, Cedar Park, TX (US); Mark Walz Wenning, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 533 days.

(21) Appl. No.: 09/956,759

(22) Filed: Sep. 20, 2001

(65) Prior Publication Data

US 2003/0056155 A1 Mar. 20, 2003

(51) Int. Cl.[7] .............................................. G06F 11/00
(52) U.S. Cl. .............................. 714/48; 714/20; 714/45
(58) Field of Search .............................. 714/4, 20, 45, 714/48; 712/13

(56) References Cited

U.S. PATENT DOCUMENTS

| | | | | |
|---|---|---|---|---|
| 5,245,615 A | * | 9/1993 | Treu | 714/45 |
| 5,805,790 A | * | 9/1998 | Nota et al. | 714/10 |
| 6,119,246 A | * | 9/2000 | McLaughlin et al. | 714/27 |
| 6,594,785 B1 | * | 7/2003 | Gilbertson et al. | 714/48 |
| 6,658,591 B1 | * | 12/2003 | Arndt | 714/6 |
| 6,675,315 B1 | * | 1/2004 | Semler et al. | 714/4 |
| 6,701,464 B2 | * | 3/2004 | Austen et al. | 714/48 |
| 2002/0124214 A1 | * | 9/2002 | Ahrens et al. | 714/57 |

* cited by examiner

*Primary Examiner*—Robert Beausoliel
*Assistant Examiner*—Emerson Puente
(74) *Attorney, Agent, or Firm*—Duke W. Yee; Mark E. McBurney

(57) ABSTRACT

A method, apparatus, and computer implemented instructions for reporting errors to a plurality of partitions. Responsive to detecting an error log, an error type for the error log is identified. If the error log is identified as a regional error log, an identification of each partition to receive the error log is made. Then, the error log is reported to each partition that has been identified to receive the error log.

20 Claims, 3 Drawing Sheets

100 DATA PROCESSING SYSTEM

METHOD AND APPARATUS FOR FILTERING ERROR LOGS IN A LOGICALLY PARTITIONED DATA PROCESSING SYSTEM

BACKGROUND OF THE INVENTION

1. Technical Field

The present invention relates generally to an improved data processing system, and in particular to a method and apparatus for processing data in a logically partitioned data processing system. Still more particularly, the present invention relates to a method and apparatus for handling error logs in a logically partitioned data processing system.

2. Description of Related Art

A logical partitioning (LPAR) functionality within a data processing system (platform) allows multiple copies of a single operating system (OS) or multiple heterogeneous operating systems to be simultaneously run on a single data processing system platform. A partition, within which an operating system image runs, is assigned a non-overlapping sub-set of the platform's resources. These platform allocable resources include one or more architecturally distinct processors with their interrupt management area, regions of system memory, and I/O adapter bus slots. The partition's resources are represented by the platform's firmware to the OS image.

Each distinct OS or image of an OS running within the platform are protected from each other such that software errors on one logical partition cannot affect the correct operation of any of the other partitions. This is provided by allocating a disjoint set of platform resources to be directly managed by each OS image and by providing mechanisms for ensuring that the various images cannot control any resources that have not been allocated to it. Furthermore, software errors in the control of an OS's allocated resources are prevented from affecting the resources of any other image. Thus, each image of the OS (or each different OS) directly controls a distinct set of allocable resources within the platform.

In handling errors, an error log is created for each particular error occurring in the LPAR data processing system. Currently, a notification is sent to all of the partitions about all areas. Such a notification is not needed because some errors may pertain to only a particular partition. For example, if a first partition is assigned a first processor and a second partition is assigned a second processor, a processor error in the first processor should be reported only to the first partition. In other cases, an error may be relevant to all of the partitions in an LPAR data processing system. For example, a power supply failure would be one that should be reported to all partitions.

Therefore, it would be advantageous to have an improved method, apparatus, and computer implemented instructions for handling error logs in an LPAR data processing system.

SUMMARY OF THE INVENTION

The present invention provides a method, apparatus, and computer implemented instructions for reporting errors to a plurality of partitions. Responsive to detecting an error log, an error type for the error log is identified. If the error log is identified as a regional error log, an identification of each partition to receive the error log is made. Then, the error log is reported to each partition that has been identified to receive the error log.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
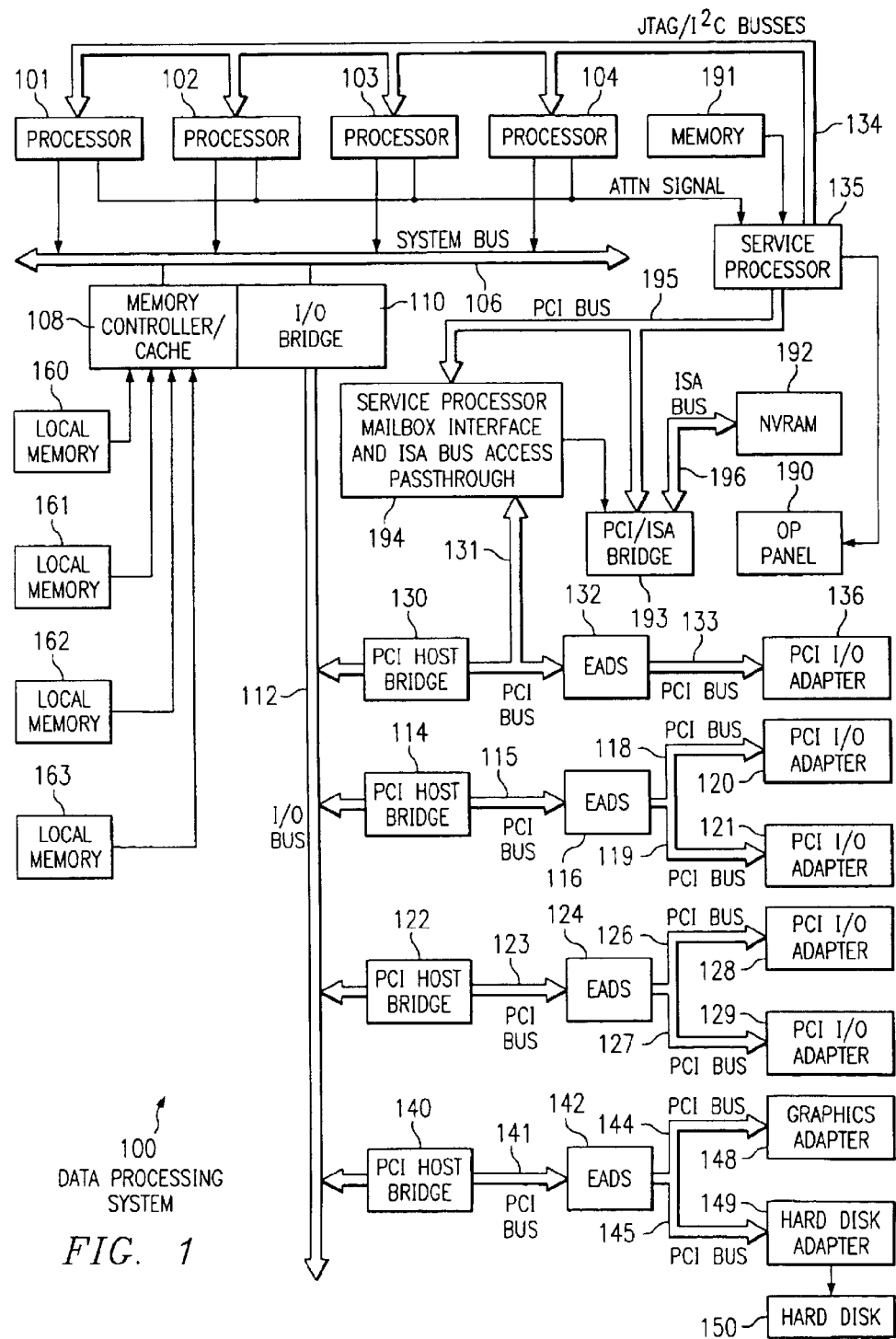
FIG. 1 is a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM RS/6000, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within in it. Data processing system 100 is logically partitioned such that different I/O adapters 120–121, 128–129, 136, and 148–149 may be assigned to different logical partitions.

Thus, for example, suppose data processing system 100 is divided into three logical partitions, P1, P2, and P3. Each of I/O adapters 120–121, 128–129, 136, and 148–149, each of processors 101–104, and each of local memories 160–164 is assigned to one of the three partitions. For example, processor 101, memory 160, and I/O adapters 120, 128, and 129 may be assigned to logical partition P1; processors 102–103, memory 161, and I/O adapters 121 and 136 may be assigned to partition P2; and processor 104, memories 162–163, and I/O adapters 148–149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Windows 2000 operating system may be operating within logical partition P1. Windows 2000 is a product and trademark of Microsoft Corporation of Redmond, Wash.

Peripheral component interconnect (PCI) Host bridge 114 connected to I/O bus 112 provides an interface to PCI local bus 115. A number of Input/Output adapters 120–121 may be connected to PCI bus 115. Typical PCI bus implementations will support between four and eight I/O adapters (i.e. expansion slots for add-in connectors). Each I/O Adapter 120–121 provides an interface between data processing system 100 and input/output devices such as, for example, other network computers, which are clients to data processing system 100.

An additional PCI host bridge 122 provide an interface for an additional PCI bus 123. PCI bus 123 is connected to a plurality of PCI I/O adapters 128–129 by a PCI bus 126–127. Thus, additional I/O devices, such as, for example, modems or network adapters may be supported through each of PCI I/O adapters 128–129. In this manner, data processing system 100 allows connections to multiple network computers.

A memory mapped graphics adapter 148 may be connected to I/O bus 112 through PCI Host Bridge 140 and EADS 142 (PCI-PCI bridge) via PCI buses 141 and 144 as depicted. Also, a hard disk 150 may also be connected to I/O bus 112 through PCI Host Bridge 140 and EADS 142 via PCI buses 141 and 145 as depicted.

A PCI host bridge 130 provides an interface for a PCI bus 131 to connect to I/O bus 112. PCI bus 131 connects PCI host bridge 130 to the service processor mailbox interface and ISA bus access pass-through logic 194 and EADS 132. The ISA bus access pass-through logic 194 forwards PCI accesses destined to the PCI/ISA bridge 193. The NV-RAM storage is connected to the ISA bus 196. The Service processor 135 is coupled to the service processor mailbox interface 194 through its local PCI bus 195. Service processor 135 is also connected to processors 101–104 via a plurality of JTAG/I$^2$C buses 134. JTAG/I$^2$C buses 134 are a combination of JTAG/scan busses (see IEEE 1149.1) and Phillips I$^2$C busses. However, alternatively, JTAG/I$^2$C buses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware op-panel 190.

When data processing system 100 is initially powered up, service processor 135 uses the JTAG/scan buses 134 to interrogate the system (Host) processors 101–104, memory controller 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the system processors 101–104, memory controller 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (Host) memories 160–163. Service processor 135 then releases the Host processors 101–104 for execution of the code loaded into Host memory 160–163. While the Host processors 101–104 are executing code from respective operating systems within the data processing system 100, service processor 135 enters a mode of monitoring and reporting errors. The type of items monitored by service processor include, for example, the cooling fan speed and operation, thermal sensors, power supply regulators, and recoverable and non-recoverable errors reported by processors 101–104, memories 160–163, and bus-bridge controller 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
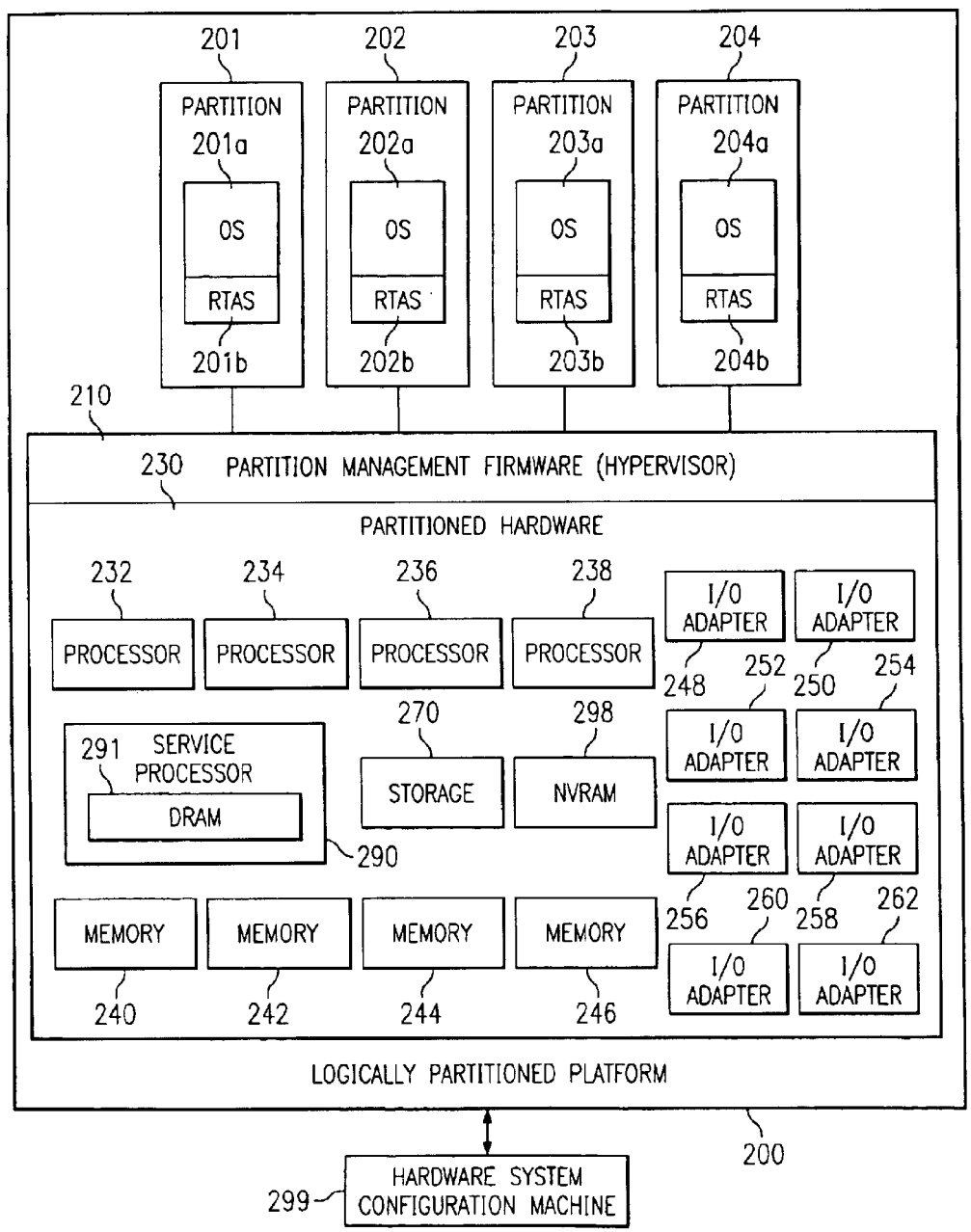
FIG. 2 is a block diagram of an exemplary logically partitioned platform in which the present invention may be implemented.

With reference now to FIG. 2, a block diagram of an exemplary logically partitioned platform is depicted in which the present invention may be implemented. The hardware in logically partitioned platform 200 may be implemented as, for example, server 100 in FIG. 1. Logically partitioned platform 200 includes partitioned hardware 230, partition management firmware, also called a hypervisor 210, and partitions 201–204. Operating systems 201a–204a exist within partitions 201–204. Operating systems 201a–204a may be multiple copies of a single operating system or multiple heterogeneous operating systems simultaneously run on platform 200.

Partitioned hardware 230 includes a plurality of processors 232–238, a plurality of system memory units 240–246, a plurality of input/output (I/O) adapters 248–262, and a storage unit 270. Each of the processors 242–248, memory units 240–246, NV-RAM storage 298, and I/O adapters 248–262 may be assigned to one of multiple partitions 201–204.

Partitioned hardware 230 also includes service processor 290. A non-volatile memory device 291, such as a DRAM device, is included within service processor 291. The partition tables and firmware images described herein, as well as other information, are stored within service processor memory 291.

Partition management firmware (hypervisor) 210 performs a number of functions and services for partitions 201–204 to create and enforce the partitioning of logically partitioned platform 200. Hypervisor 210 is a firmware implemented virtual machine identical to the underlying hardware. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM). Thus, hypervisor 210 allows the simultaneous execution of independent OS images 201a–204a by virtualizing all the hardware resources of logically partitioned platform 200. Additionally, run time abstraction services (RTASs) 201b–204b are present. Each OS is associated with an RTAS, which provides functions to insulate the operating system from having to know about and manipulate platform functions. More specifically, an RTAS is a system programming interface for a specific platform. As a result, an operating system may call a function through the RTAS without having to directly manipulate hardware, such as hardware registers. Hypervisor 210 may attach I/O devices through I/O adapters 248–262 to single virtual machines in an exclusive mode for use by one of OS images 201*a*–204*a*.

A hardware system configuration (HSC) machine 299 may be coupled to data processing system 100 which includes logically partitioned platform 200. HSC 299 is a separate computer system that is coupled to service processor 290 and may be used by a user to control various functions of data processing system 100 through service processor 290. HSC 299 includes a graphical user interface (GUI) which may be used by a user to select a partition to be rebooted. Further, a listing of different firmware images that are stored within service processor memory 291 may be presented to the user utilizing the graphical user interface of HSC 299.

The present invention provides a method, apparatus, and computer implemented instructions for filtering error logs such that only errors that pertain to a particular partition are reported to that partition. The mechanism of the present invention examines an error log type field and a location code field to identify which partitions should be notified about an error log.

Under the present invention, two types of error logs are identified. These error logs are global error logs and regional error logs. Global error logs contain errors that are pertinent to every partition in a logically partitioned data processing system. For example, a failure of a thermal sensor in the data processing system is a failure that may affect the entire system. A regional error log is one that contains errors pertinent to one or more partitions, but not all of the partitions in the logically partitioned data processing system. For example, a central processor unit or other processor failure may be pertinent only to a single partition.

The mechanism of the present invention identifies the error type in the error log to determine whether the error is a regional or global error. If the error type is a regional one, a location code string or other type of item identification is examined to identify the partition or partitions to which the error pertains. Based on this identification, the relevant partitions are notified of the presence of the error log. On the other hand, if the error type is identified as a global one, the error log is reported to all of the partitions in the data processing system.

Figure 3:
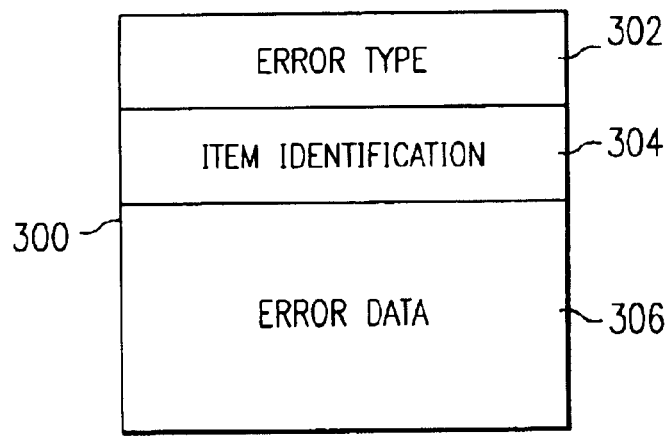
FIG. 3 is a diagram illustrating an error log in accordance with a preferred embodiment of the present invention.

With reference now to FIG. 3, a diagram illustrating an error log is depicted in accordance with a preferred embodiment of the present invention. Error log 300 includes an error type field 302, an item identification field 304, and error data field 306. The error type in error type field 302 may consist of a set of bits associated with different error types depending on the value of these bits.

Some error types that may be identified in error type field 302 include a system fan failure, a sensor failure, and a power supply failure. Other global errors may include, for example, a timeout occurring in communicating with the service processor and a shared memory error in main memory. These error types are examples of global errors that should be reported to all of the partitions. Other error types that may be identified in error type field 302 include an input/output (I/O) error or a central processing unit (CPU) error. These errors are examples of regional errors that are reported only to one or a few of the partitions. Additional examples of regional errors include errors on a PCI bus and cabling problems on a remote I/O. Item identification field 304 may be used to identify a particular processor or a particular adapter. In the case of a CPU error, the mechanism of the present invention will use the data in item identification field 304 to identify the CPU in which the error occurred. From this identification, a partition assigned to the CPU may be identified and notified of the error. With a CPU error, a unit ID may identify a group of processors in which the error occurred and a physical CPU number may be used to identify a particular processor. This CPU number may be used to identify the partition associated with the processor in which the error occurred. With an I/O bus error, item identification field 304 may contain an adapter number or location code. This information is unique to each adapter in the data processing system and may be used to identify the partition associated with or assigned to this adapter.

In Table 1 below, resources are listed in one column with the partition or partitions listed in a second column.

| RESOURCE | PARTITION |
| --- | --- |
| cpu#1 | 1 |
| cpu#2 | 1 |
| cpu#3 | 2 |
| PCI bus 1 | 1 |
| PCI bus 2 | 2 |
| memory | 1, 2 |

With respect to the example illustrated in Table 1, partition 1 is associated with two processors, a single PCI bus and a memory. Partition 2 is associated with one processor, a PCI bus, and a memory. the memory is the resource that is shared by both partitions in Table 1.

Figure 4:
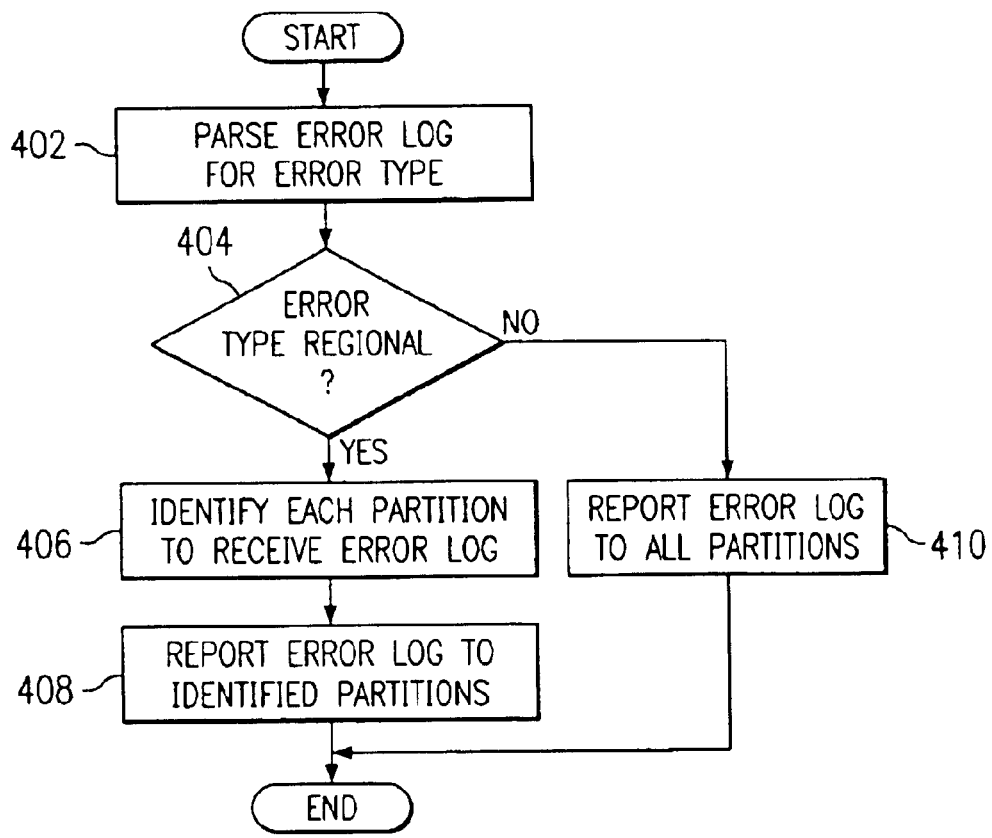
FIG. 4 is a flowchart of a process for filtering error logs, in accordance with a preferred embodiment of the present invention.

Turning next to FIG. 4, a flowchart of a process for filtering error logs, is depicted in accordance with a preferred embodiment of the present invention. The process illustrated in FIG. 4 may be implemented in open firmware, such as open firmware 210 in FIG. 2.

The process begins by parsing the error log for error type (step 402). A determination is then made as to whether the error type is regional (step 404). If the error type is regional, each partition is identified to receive the error log (step 406). The error log is then reported to the identified partitions (step 408) with the process terminating thereafter.

With reference again to step 404, if the error type is not regional, the error log is reported to all partitions (step 410) with the process terminating thereafter.

Thus, the present invention provides a method, apparatus, and computer implemented instructions for handling error logs in a logically partitioned data processing system. The mechanism of the present invention identifies error logs as being global or regional in these examples. Global error logs are reported to all of these partitions while regional error logs are reported only to partitions to which the error pertains. In this manner, a regional error log does not have to be analyzed by a particular partition to see whether action has to be taken if the error does not pertain to that partition. It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for reporting errors to a plurality of partitions, the method comprising:

responsive to detecting an error log generated in response to at least one error occurring, identifying an error type for the error log;

responsive to an identification that the error log is a regional error log, identifying each partition to receive the error log; and reporting the error log to each partition identified to receive the error log.

2. The method of claim 1 further comprising:

responsive to an identification that the error log is a global error log, reporting the error log to all of the plurality of partitions.

3. The method of claim 1, wherein the data processing system is a symmetric multiprocessor data processing system.

4. The method of claim 1, wherein the method is implemented in run time abstraction services.

5. The method of claim 1, wherein the error type is a processor and wherein the error log includes a physical central processor unit number.

6. The method of claim 1, wherein the error type is one of an input/output bus error, a fan failure, a power supply failure, and a central processor unit error.

7. The method of claim 1, wherein the error log is located in a nonvolatile random access memory in the data processing system.

8. The method of claim 1, wherein the plurality of partitions are logical partitions in a logical partitioned data processing system.

9. A data processing system comprising:

a bus system;

a communications unit connected to the bus system;

a memory connected to the bus system, wherein the memory includes a set of instructions; and a processing unit connected to the bus system, wherein the processing unit executes the set of instructions to identify an error type for an error log in response to detecting the error log generated in response to at least one error occurring; identify each partition to receive the error log in response to an identification that the error log is a regional error log, and report the error log to each partition identified to receive the error log.

10. The data processing system of claim 9, wherein the plurality of partitions are logical partitions in a logical partitioned data processing system.

11. A data processing system for reporting errors to a plurality of partitions, the data processing system comprising:

first identifying means, responsive to detecting an error log generated in response to at least one error occurring, for identifying an error type for the error log;

second identifying means, responsive to an identification that the error log is a regional error log, for identifying each partition to receive the error log; and reporting means for reporting the error log to each partition identified to receive the error log.

12. The data processing system of claim 11, wherein the reporting means is a first reporting means and further comprising:

second reporting means, responsive to an identification that the error log is a global error log, for reporting the error log to all of the plurality of partitions.

13. The data processing system of claim 11, wherein the data processing system is a symmetric multiprocessor data processing system.

14. The data processing system of claim 11, wherein the data processing system is implemented in open firmware.

15. The data processing system of claim 11, wherein the error type is a processor and wherein the error log includes a physical central processor unit number.

16. The data processing system of claim 11, wherein the error type is one of an input/output bus error, a fan failure, a power supply failure, and a central processor unit error.

17. The data processing system of claim 11, wherein the error log is located in a nonvolatile random access memory in the data processing system.

18. The data processing system of claim 11, wherein the plurality of partitions are logical partitions in a logical partitioned data processing system.

19. A computer program product in a computer readable medium for reporting errors to a plurality of partitions, the computer program product comprising:

first instructions, responsive to detecting an error log generated in response to at least one error occurring, for identifying an error type for the error log;

second instructions, responsive to an identification that the error log is a regional error log, for identifying each partition to receive the error log; and third instructions for reporting the error log to each partition identified to receive the error log.

20. The computer program product of claim 19, wherein the plurality of partitions are logical partitions in a logical partitioned data processing system.

* * * * *